United States Patent

Shibata et al.

[11] 3,972,617
[45] Aug. 3, 1976

[54] SPECTROPHOTOMETER

[75] Inventors: Kazuo Shibata, Tokyo; Yoshio Fukuda, Kyoto; Michinosuke Takada, Kyoto; Katsuo Nakanomyo, Kyoto, all of Japan

[73] Assignee: Shimadzu Seisakusho Ltd., Kyoto, Japan

[22] Filed: Oct. 31, 1974

[21] Appl. No.: 519,673

[30] Foreign Application Priority Data

Nov. 5, 1973 Japan.............................. 48-124258

[52] U.S. Cl................................... 356/88; 356/95; 356/96; 356/97
[51] Int. Cl.²........................................ G01J 3/42
[58] Field of Search................. 356/88, 93, 95–97, 356/229

[56] References Cited
UNITED STATES PATENTS
3,737,234  6/1973  Shibata et al..................... 356/95 X FOREIGN PATENTS OR APPLICATIONS
1,074,810  7/1967  United Kingdom................. 356/229

OTHER PUBLICATIONS

Shimadzu Multipurpose Recording Spectrophotometer Model MPS-50L, Catalog P63-026 II, pp. 1-30.

*Primary Examiner*—John K. Corbin
*Assistant Examiner*—F. L. Evans
*Attorney, Agent, or Firm*—Fidelman, Wolffe & Waldron

[57] ABSTRACT

A spectrophotometer which comprises a monochromator, a pair of cells to which the light from the monochromator is projected, means for converting the light from the cells into corresponding electrical signals, means for comparing the electrical signals to produce an output, means for magnetically recording the output from the comparing means, means connected to the output of the comparing means to perform predetermined arithmetic operations thereon, and means for recording the output from the last-mentioned means, whereby various types of spectra of substances such as derivative spectra, difference spectra and the derivatives thereof can easily be obtained.

9 Claims, 9 Drawing Figures

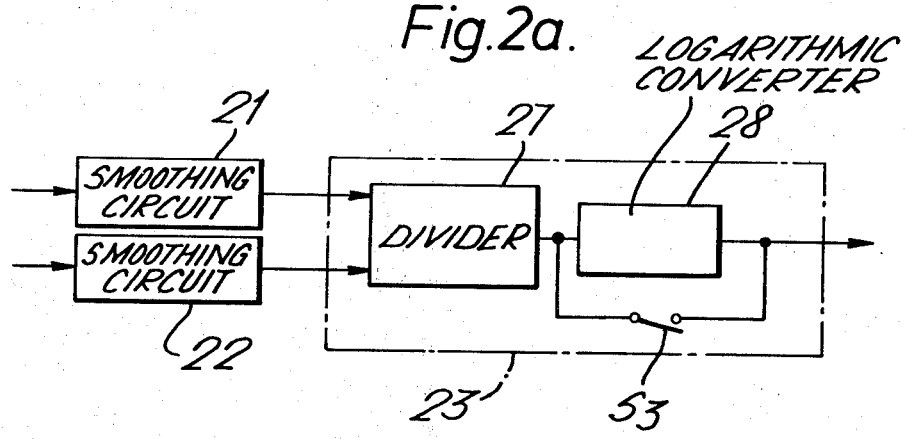
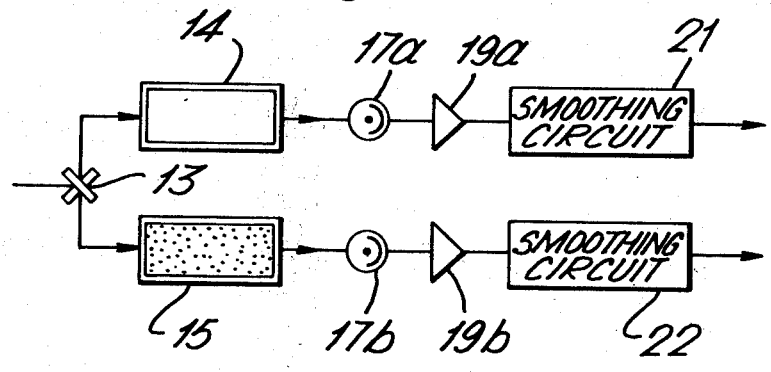

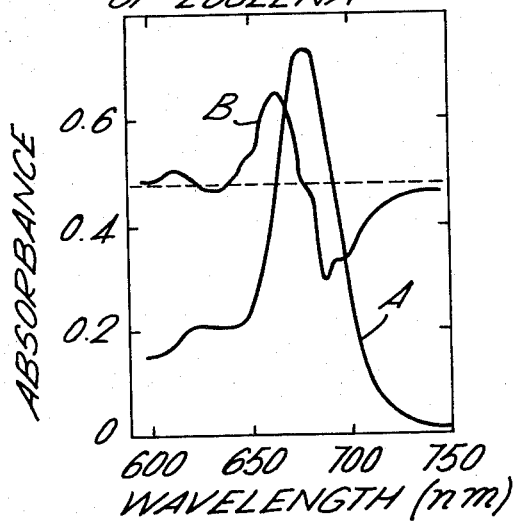
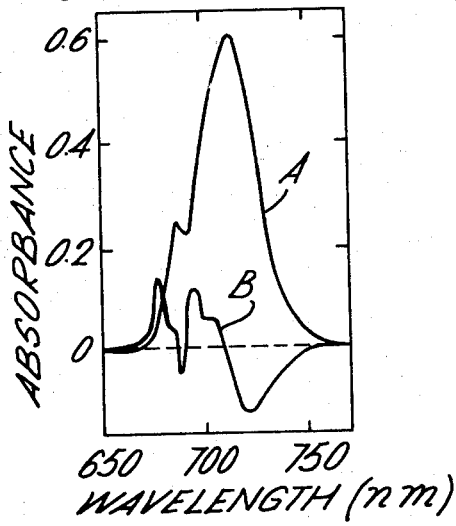
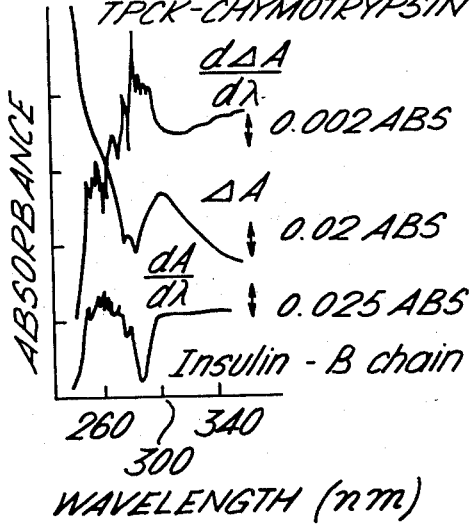

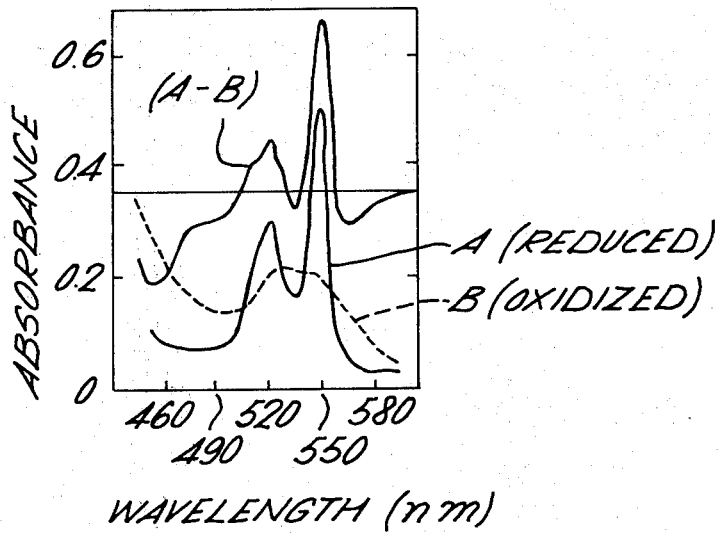
Fig. 6. DIFFERENCE SPECTRUM OF CYTOCHROME C.
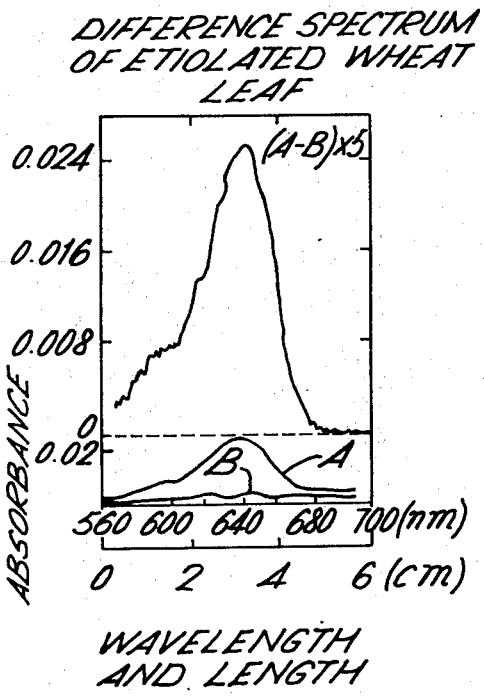
Fig. 7. DIFFERENCE SPECTRUM OF ETIOLATED WHEAT LEAF
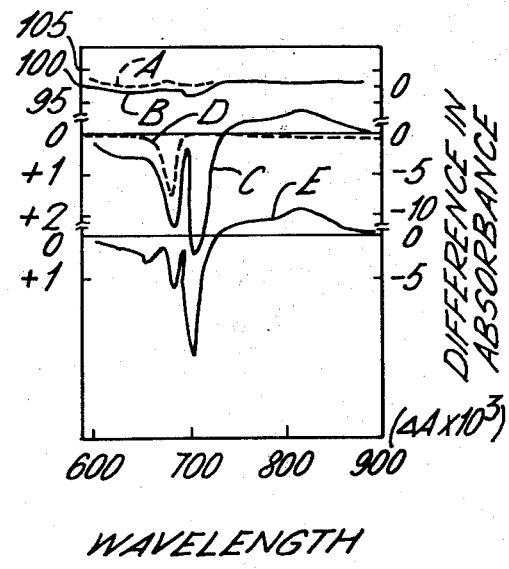
Fig. 8. DIFFERENCE SPECTRUM OF CHLOROPHYLL

SPECTROPHOTOMETER

This invention relates to a spectrophotometer and more particularly to a spectrophotometer provided with an apparatus for processing and recording the signals obtained from measurement of samples.

It has been proposed to use a tape recorder for processing the signals obtained from measurement of samples by a spectrophotometer. However, in the prior art the tape recorder has been used for particular purposes of data processing.

It is one object of the invention to provide a spectrophotometer provided with a data processing apparatus, which can be used for various measuring purposes.

Another object of the invention is to provide a spectrophotometer which is capable of measuring the derivative spectra of substances.

Another object of the invention is to provide a spectrophotometer which is capable of measuring the difference spectra of substances.

Still another object of the invention is to provide such a spectrophotometer as aforesaid in a relatively simple construction which comprises a conventional spectrophotometer, tape recorders and a few additional component elements.

The invention with its above and other objects, features and advantages will become apparent from the following detailed description of some preferred embodiments thereof with reference to the accompanying drawings, wherein;

FIG. 2a is a schematic showing of a modified form of the comparing circuit of the the apparatus shown in FIG. 1;

FIG. 2b is a schematic showing of another form of a portion of FIG. 1; and

FIGS. 3 through 8 are graphs showing various spectra obtained from measurements by the use of the apparatus of the invention.

Figure 1:
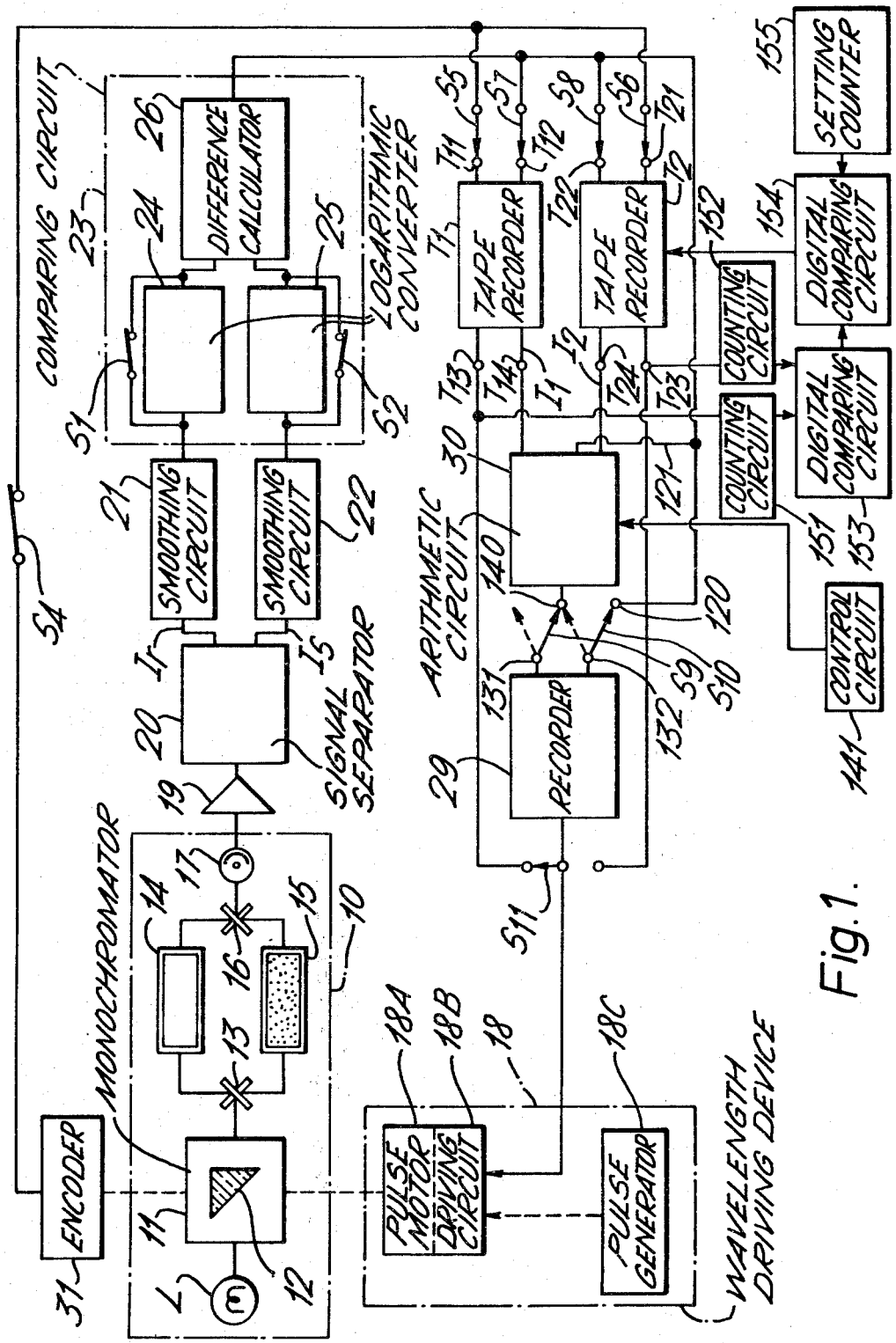
FIG. 1 is a schematic showing of one embodiment of the invention.

Referring in detail to FIG. 1, there is shown in block diagram a spectrophotometer 10 of the double-beam, single-detector type, which comprises a light source L, a monochromator 11 including a light dispersing element 12 such as a prism or grating, a first beam switch 13, a pair of cells 14 and 15, a second beam switch 16 and a detector 17 such as a photomultiplier tube.

The element 12 is driven by a wavelength driving device 18 to disperse the light from the source L into different wavelengths, among which a selected one is passed through the exit slit (not shown) of the monochromator. The wavelength driving device 18 may be any known continuous driving device or comprise a pulse motor 18A, a pulse motor driving circuit 18B and a pulse generator 18C.

The cell 14 may contain a reference material and will be called the reference cell while the other cell 15 may contain a sample material and will be called the sample cell.

The light beams passed through the material in the cells 14 and 15 are alternately projected into the photomultiplier tube 17. It should be noted that the words "passed" is here used in its broadest sense so that "the light passed through the material" means "the light transmitted through the material" or "the light reflected by the material" or "the fluorescence emitted from the material", etc.

The output from the photomultiplier tube 17 is amplified by an amplifier 19 and applied to a signal separator 20, which separates the output from the amplifier into a signal component corresponding to the light beam (reference beam) passed through the reference cell 14 and a signal component corresponding to the light beam (sample beam) passed through the sample cell 15. The former signal component will be referred to as the reference signal and designated by Ir and the latter signal will be referred to as the sample signal and designated by Is.

The signal Ir and Is are applied through smoothing circuits 21 and 22, respectively, to a comparing circuit 23 which compares the outputs from the smoothing circuits. The comparing circuit may be so designed as to calculate the difference between the signals from the smoothing circuits or the ratio thereof. In the illustrated embodiment the circuit 23 comprises a pair of logarithmic converters 24 and 25 to which the outputs from the smoothing circuits 21 and 22 are applied respectively and a circuit 26 which is so designed as to produce an output corresponding to the difference between the two outputs from the converters 24 and 25. In other words, the output from the circuit 23 expresses the difference between the absorbances of the reference and sample materials.

A switch S1 may be connected across the logarithmic converter 24 and a switch S2, across the logarithmic converter 25. When the switches S1 and S2 are closed to short-circuit the converters 24 and 25, the outputs from the smoothing circuits 21 and 22 are directly applied to the circuit 26, so that the circuit 23 now functions as a mere subtractor.

As an alternative, the circuit 23 may comprise a dividing circuit 27 to which the outputs from the smoothing circuits 21 and 22 are applied, as shown in FIG. 2a. The divider 27 produces an output corresponding to the ratio of the two outputs from the smoothing circuits 21 and 22. The output from the divider 27 is applied to a logarithmic converter 28 which is so designed as to provide a signal corresponding to the logarithm of the ratio.

A switch S3 may be connected across the converter 28. If the swtich is closed to short-circuit the converter 28, the circuit 23 functions as a mere divider.

A recorder 29 is provided to record either the output from the comparing circuit 23 or the output from an arithmetic circuit 30 to be described later, or both the outputs of these circuits 23 and 30 at the same time.

An encoder 31 is associated with the monochromator so that every time a small wavelength range or width has been scanned, the encoder 31 produces an output pulse. Instead of the encoder 31, the pulses from the pulse generator 18c may be used for the same purpose.

A first two-channel tape recorder T1 of the frequency modulation type has an input terminal T11 and an output terminal T13 for the first channel and an input terminal T12 and an output terminal T14 for the second channel. Similarly, a second two-channel tape recorder T2 of the frequency modulation type has an input terminal T21 and an output terminal T23 for the first channel and an input terminal T22 and an output terminal T24 for the second channel.

The input terminal T11 is connected through switches S5 and S4 to the output of the encoder 31 and the input terminal T21 is connected through a switch S6 and the switch S4 to the output of the encoder 31. The second-channel input terminals T12 and T22 are connected through switches S7 and S8, respectively, to the output of the comparing circuit 23. The first channel of each of the two tape recorders is used as the control channel, while the second channel is used for recording the measured data.

The second-channel outputs $I_1$ and $I_2$ of the tape recorders T1 and T2 are applied to the arithmetic circuit 30 which is so designed as to perform arithmetic operations, that is, addition ($I_1+I_2$), subtraction ($I_1-I_2$ or $I_2-I_1$), multiplication ($I_1 \times I_2$) or division ($I_1/I_2$ or $I_2/I_1$) under the control of a control circuit 141.

The output from the comparing circuit 23 is also directly applied to the arithmetic circuit 30 through a line 121, so that the above arithmetic operations may be performed with one of the outputs $I_1$ and $I_2$ and the output from the comparing circuit 23.

The recorder 29 may be of a two-channel type, and has a first channel input terminal 131 connected through a switch S9 to the output terminal 140 of the arithmetic circuit 30 and the output terminal 120 of the comparing circuit 23.

If the recorder 29 has a single channel, the above-mentioned first channel is omitted.

The control channels of the tape recorders can be used for various purposes. In the illustrated embodiment, the control channel output terminals T13 and T23 are also connected through a switch S11 to the motor driving circuit 18B of the wavelength driving device 18 so as to control the wavelength driving of the monochromator and also to the recorder 29 so as to control the driving of the chart thereof. The switch S11 selectively applies either one of the control channel outputs from the first and second tape recorders to the circuit 18B, or prevents both of the outputs from being applied to the circuit 18B. With the provision of the switch S11, the pulse generator 18C may be omitted. When an ordinary continuous wavelength driving device is used as the device 18, the control channel output may be a signal to merely render the device 18 operative or inoperative. The control signal may be supplied from other channels of the tape recorders than the previously mentioned control channels.

The control channel outputs are used also for control of the operation of the tape recorders T1 and T2. The output terminals T13 and T23 of the tape recorders are connected to the inputs of counting circuits 151 and 152, respectively, the outputs of which are applied to a first digital comparing circuit 153. A second digital comparing circuit 154 compares the output from the first digital comparing circuit 153 and that of a setting counter 155 and produces an output to be applied to, say, the second tape recorder T2 to control the same in such a manner that the output from the circuit 154 becomes zero, thereby keeping the operating relation between the first and second tape recorders T1 and T2 in a predetermined condition, for example, making the two tape recorders operate in synchronism with each other or with a predetermined lag between the two.

The counting circuits 151 and 152 and the first digital comparing circuit 153 may be replaced by a single reversible counter.

Now various modes of operation of the system of the invention will be described below.

I. In order to record the output from the spectrophotometer directly by the recorder 29, a reference material or solvent and a sample material or solution are put into the cells 14 and 15, respectively, and with the switches S1 – S8 being kept open or closed, and the switch 9 being not in touch with the terminal 140 and the switch S10 in contact with the terminal 120, the spectrophotometer is operated to scan a predetermined range of wavelength.

The monochromatic light from the monochromator is directed by the beam switch 13 alternately at a predetermined cycle into the reference and sample cells 14 and 15. The light passed through the cells are alternately projected by the second beam switch 16 operating in synchronism with the first beam switch 13 into the photomultiplier tube 17, which produces output signals corresponding to the intensities of the beams coming out of the cells, respectively.

The output from the photomultiplier tube 17 is amplified by the amplifier 19 and then separated by the signal separator 20 which may be a demodulator into a reference signal Ir and a sample signal Is. The signals are smoothed by the smoothing circuits 21 and 22, respectively, and then applied to the comparing circuit 23, the output from which is applied through the switch 10 to the recorder 29.

If the switches S1 and S2 are kept open, the recorder 29 records the absorbance spectrum of the sample being measured. If the switches S1 and S2 are kept closed, the recorder records the transmittance spectrum of the sample.

II. If the result of the measurement in case I) is to be recorded in the tape recorders T1 and/or T2, the switches S7 and/or S8 connected to the input terminals T12 and T22 of the first and second tape recorders are closed.

III. If the switch S10 is in contact with the terminal 120 in case (II), it is possible to record the result of the measurement in the recorder 29 as well as in the tape recorders T1 and T2.

IV. If a derivative spectrum of a sample is to be obtained, the result of measurement is recorded in the tape recorders T1 and T2 simultaneously, and then the two data are read out by feeding one of the tapes displaced from the other by a minute length corresponding to a predetermined minute wavelength difference. By causing the circuit 30 to calculate the difference between the data read out from the tape recorders at the same time, the recorder 29 can record the derivative spectrum of the sample.

In this case the required displacement of the feeding of one of the two tapes from the other is accomplished by utilizing the pulses read out from the control channels of the tapes in accordance with the setting of the setting circuit 155.

If the tapes of the two tape recorders are fed at the same speed, the above-mentioned displacement can be accomplished by delaying the start of one of the two tapes. Alternatively, the displacement may be accomplished when the result of measurement is recorded on the two tapes.

By using the above-mentioned method it is possible to obtain not only the derivatives of usual absorption spectra but also the derivatives of fluorescence spectra as well as those of difference spectra, so that the above method is very effective in finding out hidden absorption bands and/or quantitative analysis thereof.

FIGS. 3 to 5 show some such examples. First, FIG. 3 shows an absorption curve A of Euglena together with its derivative curve B which clearly shows a fine structure near 700 nm.

In FIG. 4 a fluorescence spectrum of a suspension containing Chlorella cells at 77°K is plotted at A, with its derivative curve plotted at B. The derivative spectrum clearly shows the detail of the curve A near 690 nm.

FIG. 5 shows a difference spectrum ($\Delta A$) between chymotrypsin and chymotrypsin combined with TPCK, together with its derivative spectrum ($d\Delta A/d\lambda$) which clearly shows an absorption band of phenylalanine at about 260 nm where there appears no such absorption band in the difference spectrum $\Delta A$. In FIG. 5 a derivative spectrum ($dA/d\lambda$) of insulin-B-chain is shown for comparison.

V. By comparing or performing arithmetic operations on the baseline signal previously recorded in one of the tapes and the signal recorded later on in the other tape with appropriate wavelength synchronization or one-to-one correspondence, or by comparing or performing arithmetic operations on the signal read out from the tapes and the output produced by the comparing circuit 24 with appropriate wavelength synchronization or one-to-one correspondence, it is possible to obtain a baseline corrected spectrum of the sample.

By this method it is possible to eliminate errors due to the cells or changes in the slit or the negative high voltage to the detector, etc. in the measurement of sample solutions of high concentrations or difference spectra at low temperatures.

When the method is used for measurement of the difference spectrum of a single leaf of a plant by means of a dual-wavelength position scanner, it is possible to obtain a flat baseline which would otherwise be very complicated.

When the method is used for measurement of the difference between the values at two different times of a spectrum which changes as time passes, it is possible to obtain a time-dependent difference spectrum. Also the method makes it possible to eliminate the effects of fluorescence in the light-minus-dark difference spectrum of chlorophyll measured by the spectrophotometer provided with the dynode feedback system.

FIGS. 6 to 8 show some examples of spectra obtained in the above method.

In FIG. 6 the curve A represents an absorption spectrum of the reduced form of cytochrome c; the curve B represents that of the oxidized form thereof; and the curve (A–B) represents the difference spectrum of the two forms. As clearly shown, the difference spectrum is on a corrected baseline.

FIG. 7 shows the results of measurements conducted by a dual-wavelength position scanner of the distribution of chlorophyll in an etiolated wheat leaf before and after illumination of the leaf through an interference filter the wavelength characteristics of which changes along the length thereof, piled on the leaf. The curve B is the profile of chlorophyll before the illumination while the curve A is that after the illumination. The curve (A–B) × 5 represents the difference profile of A and B enlarged 5 times, with almost complete correction having been attained of the baseline which would otherwise have been very complicated, thereby providing an action spectrum showing formation of chlorophyll.

FIG. 8 shows an example in which the influence of fluorescence is eliminated from the light-minus-dark difference spectrum of chlorophyll. The curve A is the baseline, that is, a spectrum obtained when the sample is not excited by light; the curve B is a light-minus-dark spectrum obtained when the sample is excited by light; and the curve C is the difference between the curves A and B, from which the effect of fluorescence D is eliminated to give a true difference spectrum E.

Having illustrated and described a preferred embodiment of the invention, it is to be understood that there are many modifications and changes. For example, instead of the two-channel tape recorders, a single tape recorder having more than two channels may be employed. In this case, one of the channels may be used as the control channel, while the other channels are used for measurement. Instead of the single-detector type of spectrophotometer, a double-detector type as shown in FIG. 2b or any other type of spectrophotometer may as well be employed.

In FIG. 2b the monochromatic light from the monochromator is alternately directed by beam switch 13 into the reference and sample cells 14 and 15. The light beams from the cells are applied to photomultiplier tubes 17a and 17b, the outputs from which are amplified by amplifiers 19a and 19b to be applied to the smoothing circuits 21 and 22. The outputs from the smoothing circuits 21 and 22 are applied to the comparing circuit 23 as shown in FIG. 1 or FIG 2a.

The beam switch 13 may be replaced by a beam splitter such as a half mirror. In this case the smoothing circuits are not needed.

What we claim is:

1. A spectrophotometer comprising: means for providing monochromatic light; a pair of first and second cells; means for projecting said monochromatic light into said first and second cells so that a first and a second light beam issue from said first and second cells; means for receiving said first and second beams to produce corresponding first and second electrical signals; means for comparing said first and second electrical signals; magnetic recording means including a plurality of magnetic recording media for recording the output from said comparing means and means for driving said recording media independently of each other; means for reading out from each of said magnetic recording media control signals recorded thereon; means for comparing said control signals and controlling said driving means as a function of the comparison; means connected to the output of said magnetic recording means and the output of said electrical signal comparing means to perform predetermined mathematical operations thereon; and means for recording the output of said mathematical operation means.

2. The spectrophotometer of claim 1, wherein said magnetic recording means comprises a pair of two-channel tape recorders.

3. The spectrophotometer of claim 1, wherein said comparing means comprises means for providing the logarithms of said first and second electrical signals; and means for providing an electrical signal corresponding to the difference between said logarithms.

4. The spectrophotometer of claim 1, wherein said comparing means comprises means for providing the ratio of said first and second electrical signals; and means for providing the logarithm of said ratio.

5. The spectrophotometer of claim 1, wherein said means for projecting said monochromatic light into said first and second cells comprises a first beam switch which alternately directs said monochromatic light into said first and second cells; and said means for receiving said first and second beams to produce corresponding first and second electrical signals comprises a single photosensor and a second beam switch which alternately directs said first and second beams onto said photosensor.

6. The spectrophotometer of claim 1, wherein said means for receiving said first and second beams to produce corresponding first and second electrical signals comprises a pair of photosensors which receive said first and second beams, respectively.

7. The spectrophotometer of claim 1 wherein said monochromatic light means includes means for scanning said monochromatic light for producing monochromatic light of different wavelengths, and including means responsive to said scanning means for applying control signals to each of said recording media.

8. The spectrophotometer of claim 7 wherein said control signals comparing means includes a plurality of counting means connected to said control signal readout means, one for each recording media; a digital means for comparing the values of said counting means and a preset value and for controlling said driving means as a function of the comparison.

9. The spectrophotometer of claim 1 including switch means connected to said comparing means, said magnetic recording means, said mathematical operation means and said recording means for selectively interconnecting the enumerated means.

* * * * *